H. Boyd,
Overflow Basin.

N°. 62,812.   Patented Mar. 12, 1867.

Witnesses,
Chas. H. Smith
Geo. D. Walker

Inventor;
Harkness Boyd
per L. W. Serrell
Atty

United States Patent Office.

HARKNESS BOYD, OF NEW YORK, N. Y.

Letters Patent No. 62,812, dated March 12, 1867.

---

IMPROVEMENT IN OVERFLOW BASINS.

---

*The Schedule referred to in these Letters Patent and making part of the same.*

---

TO ALL WHOM IT MAY CONCERN:

Be it known that I, HARKNESS BOYD, of the city and State of New York, have invented and made a certain new and useful Improvement in Overflows for Basins, Water-Closets, &c.; and I do hereby declare the following to be a full, clear, and exact description of the said invention, reference being had to the annexed drawing, making part of this specification, wherein—

Similar marks of reference denote the same parts.

Figure 1:
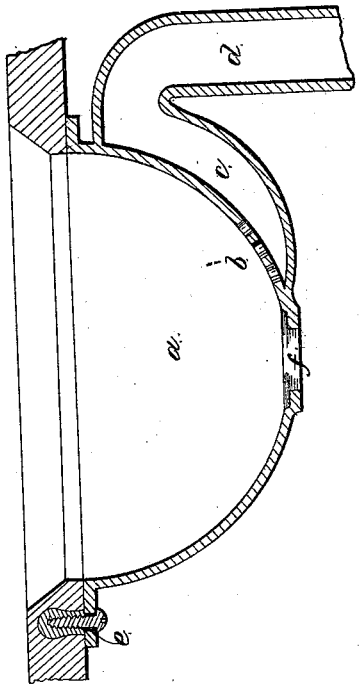
Figure 1 is a vertical section of my improved basin.
Figure 2:
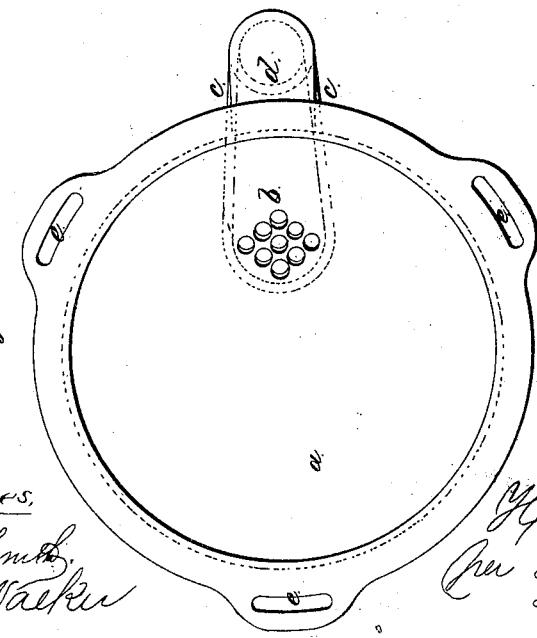
Figure 2 is a plan of the same.

Overflows for basins have usually been made by introducing a cluster of holes near the top, leading into a pipe that passes to a sewer or drain. The holes are in a position where they are but seldom washed out by the water flowing through them, and they become clogged and more or less stopped by dirt and soapy matter lodged in said holes by wiping out the basin. Injury often results from a faucet being left open and the water flowing over the edges of the basin because the overflow is inadequate.

The nature of my said invention consists in a siphon overflow for a basin, bath tub, or similar article, the cluster of holes to the overflow pipe being at or near the bottom of the vessel, and the overflow pipe extending up to the desired highest water level and then descending to the sewer or drain. By this construction the water flows back and forth through the cluster of holes when the basin or vessel is used keeping them clean, and when the overflow becomes operative in consequence of the vessel becoming too full, the siphon action is very powerful in drawing away the water with rapidity, and continues to act until the basin or vessel is nearly emptied.

In the drawing, $a$ is the basin or vessel of any desired size or shape; $b$ is the cluster of holes near the bottom thereof; $c$ is the ascending portion, and $d$ the descending portion, of the siphon overflow pipe, the action thereof being as before mentioned. An ordinary waste pipe and plug is to be provided for emptying the vessel, as seen at $f$. In order to attach the basin to the under side of the marble slab usually employed, I make use of bolts, screwing into lead or soft-metal nuts, cast into holes in the marble, and I form the flange of the basin with segmental slots at $e\ e\ e$, through which said bolts are screwed. This mode of attachment is much more reliable than that heretofore employed, because the basin can be cemented directly to the marble and made water-tight at this point.

What I claim, and desire to secure by Letters Patent, is—

A stationary basin or vessel having an ordinary waste or discharge plug, in combination with an overflow pipe, opening into said vessel near the bottom thereof, and ascending, as a siphon, to the desired water level of such basin, as and for the purposes specified.

In witness whereof I have hereunto set my signature this 18th day of October, A. D. 1866.

HARKNESS BOYD.

Witnesses:
GEO. D. WALKER,
CHAS. H. SMITH.